(12) United States Patent
Vaders

(10) Patent No.: US 7,096,916 B2
(45) Date of Patent: Aug. 29, 2006

(54) METHOD OF MANUFACTURING CONSOLIDATED CELLULOSIC PANELS WITH CONTOURED SURFACES AND VARIABLE BASIS WEIGHT

(75) Inventor: Dennis H. Vaders, Elkin, NC (US)

(73) Assignee: Masonite Corporation, Tampa, FL (US)

(*) Notice: Subject to any disclaimer, the term of this patent is extended or adjusted under 35 U.S.C. 154(b) by 98 days.

(21) Appl. No.: 10/847,461

(22) Filed: May 18, 2004

(65) Prior Publication Data

US 2004/0213987 A1    Oct. 28, 2004

Related U.S. Application Data

(62) Division of application No. 09/995,525, filed on Nov. 28, 2001, now Pat. No. 6,743,318.

(51) Int. Cl.
*B29C 65/00* (2006.01)

(52) U.S. Cl. ............... 156/581; 156/510; 156/526; 156/580; 425/83.1; 425/406; 425/412

(58) Field of Classification Search ............... None
See application file for complete search history.

(56) References Cited

U.S. PATENT DOCUMENTS

| | | | |
|---|---|---|---|
| 1,867,575 A | 7/1932 | Loetscher | |
| 2,260,453 A | 10/1941 | Hartman | 18/61 |
| 2,907,071 A | 10/1959 | Meiler et al. | 18/47.5 |
| 3,057,022 A | 10/1962 | Bär et al. | 19/155 |
| 3,549,738 A | 12/1970 | Troyer | 264/118 |
| 4,096,796 A | 6/1978 | Saunders et al. | 100/35 |
| 4,169,748 A | 10/1979 | Clarke et al. | 156/62.2 |
| 4,175,106 A | 11/1979 | Clarke et al. | 264/118 |
| 4,221,751 A | 9/1980 | Haataja et al. | 264/119 |
| 4,248,163 A * | 2/1981 | Caughey et al. | 108/53.3 |
| 4,378,265 A | 3/1983 | Kiss | 156/242 |
| 4,421,700 A | 12/1983 | Patel | 264/59 |
| 4,568,581 A | 2/1986 | Peoples, Jr. | 428/35 |
| 4,622,190 A * | 11/1986 | Schultz | 264/119 |
| 4,666,647 A | 5/1987 | Enloe et al. | 264/121 |
| 4,690,853 A | 9/1987 | Hammond | 428/157 |
| 4,693,860 A | 9/1987 | Thelen | 264/320 |
| 4,734,236 A | 3/1988 | Davis | 264/112 |
| 4,761,258 A | 8/1988 | Enloe | 264/518 |
| 4,830,929 A | 5/1989 | Ikeda et al. | |
| 4,852,630 A | 8/1989 | Hamajima et al. | 164/761 |
| 4,869,855 A | 9/1989 | Twilley et al. | 264/25 |
| 4,923,658 A | 5/1990 | Hover et al. | 264/76 |
| 4,927,582 A | 5/1990 | Bryson | 264/113 |
| 5,183,622 A | 2/1993 | Persson | 264/320 |

(Continued)

*Primary Examiner*—Sam Chuan Yao
(74) *Attorney, Agent, or Firm*—Berenato, White & Stavish, LLC

(57) ABSTRACT

A method and system for manufacturing a consolidated cellulosic article having first and second surfaces of a desired contour, a uniform density and variable caliper and basis weight are disclosed. The method and system employ a primary press having first and second similarly contoured platens to consolidate a mat of cellulosic material and a binding agent to a softboard having first level of density with first and second opposed sides of similar contour. A removal tool is then employed to remove cellulosic material from one or both of the first and second sides in a planar fashion. The resulting mat is then compressed a second time by a secondary press having first and second platens corresponding in shape to a higher density level while maintaining a substantially uniform caliper and basis weight.

10 Claims, 3 Drawing Sheets

U.S. PATENT DOCUMENTS

| | | |
|---|---|---|
| 5,427,723 A | 6/1995 | Kugler et al. ................ 264/119 |
| 5,658,511 A | 8/1997 | Nicolay |
| 5,756,024 A | 5/1998 | Huang ........................ 264/113 |
| 5,807,513 A | 9/1998 | Gebreselassie et al. .... 264/37.3 |
| 5,824,246 A | 10/1998 | Reetz |
| 2002/0046805 A1* | 4/2002 | Moyes ........................ 156/292 |

* cited by examiner

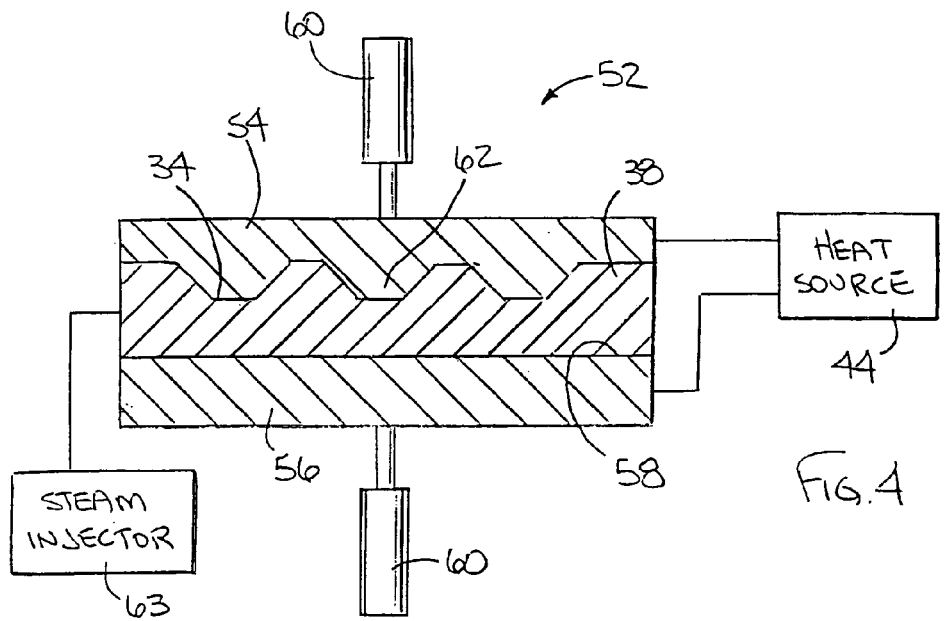
FIG. 4
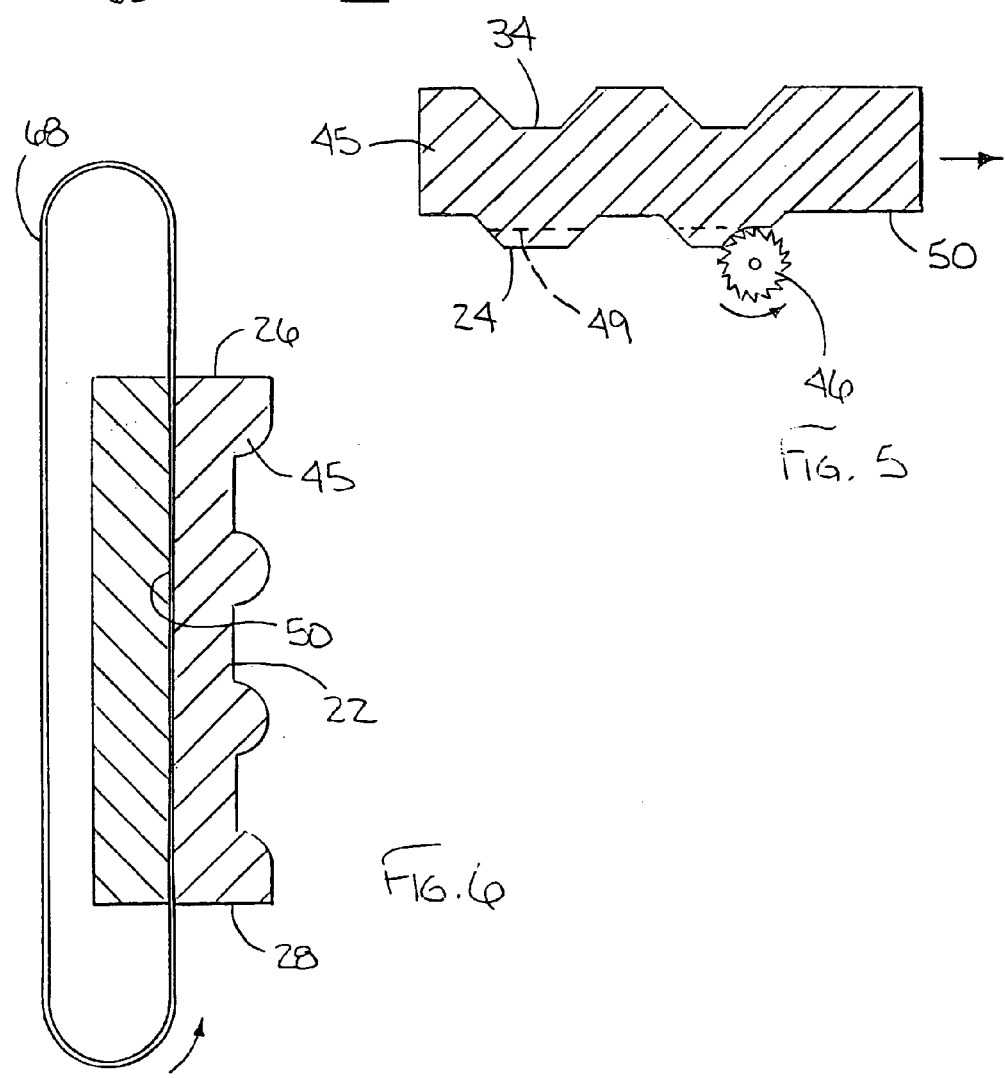
FIG. 5
FIG. 6

METHOD OF MANUFACTURING CONSOLIDATED CELLULOSIC PANELS WITH CONTOURED SURFACES AND VARIABLE BASIS WEIGHT

CROSS REFERENCE TO RELATED APPLICATIONS AND CLAIM TO PRIORITY

This application is a divisional of application Ser. No. 09/995,525, filed Nov. 28, 2001, now U.S. Pat. No. 6,743,318 the disclosure of which is incorporated herein by reference and priority to which is claimed pursuant to 35 U.S.C. § 120.

BACKGROUND OF THE INVENTION

1. Field of the Invention

The invention generally relates to wood products and, more particularly, relates to methods of manufacturing consolidated cellulosic panels.

2. Description of Related Technology

Consolidated cellulosic panels, such as fiber board, paper board, particle board, and the like, are typically comprised of wood furnish such as saw dust, shavings, chips, or specially ground fibers, compressed with a binding agent or resin under heat and pressure. Such boards can be used in a variety of applications including, but not limited to, exterior house siding, interior and exterior door facing panels or door skins, cabinet doors, paneling, moulding, etc.

It is often desirable to manufacture such panels to a uniform basis weight and caliper. If the panels are flat this can be accomplished by compressing a mat between first and second flat faced dies. However, if one of the faces needs to be deeply contoured, such die compressions have proven to be problematic. For example, if a first die has a contour corresponding to the desired shape of the panel, and the second die has a flat face, the mat compressed therebetween will have a non-uniform caliper, with the thinner areas of the mat being compressed to a higher density than thicker areas. This is especially true with fiberous materials that do not flow under pressure.

Current methods of producing such panels therefore typically require that a mat having first and second opposed flat surfaces be compressed according to conventional methods, and that one or more of the surfaces then be machined to have the desired contour. For example, a router may be used to shape the surfaces. U.S. Pat. No. 4,175,106, assigned to the present assignee, discloses such a process. Such tools, however, cannot easily produce sharp inside corners, are relatively slow, and require complex, expensive equipment.

Another method requires contoured, complementary, dies on both the top and bottom to produce a substantially uniform thickness through the contoured and non-contoured areas. If one of the top or bottom needs to be flat, or alternatively shaped, the panel must undergo an added machining step adding time, expense and waste to the operation. Shallow contouring of one face is typically done in an embossing operation, or with an embossing die, but the depth of embossing is greatly limited.

SUMMARY OF THE INVENTION

In accordance with one aspect of the invention, a method for producing a consolidated cellulosic article is provided. The method comprises the steps of providing a mat of cellulosic material and binder resin, providing a first contoured front platen having a first pattern, providing a first contoured rear platen having a pattern generally corresponding to the pattern of the front platen, consolidating the mat between the front platen and the rear platen under heat and pressure to form a molded softboard having a contoured front surface and a correspondingly contoured rear surface, the softboard having a substantially uniform density and a substantially uniform caliper, removing portions of the molded softboard to form a softboard having a front surface and a rear surface with desired contours, providing a second contoured front platen having a contour substantially corresponding to the contour of the front surface, providing a second contoured platen having a contour substantially corresponding to the contour of the rear surface, and consolidating the softboard between the second contoured front platen and the second contoured rear platen under heat and pressure.

In accordance with another aspect of the invention, a method of producing a consolidated cellulosic article is provided comprising the steps of compressing a mat of cellulosic material and a binder resin between first and second contoured platens to produce a softboard having first and second opposed contoured sides, removing cellulosic material from the softboard along one of the first or second sides in a planar fashion, and subsequently compressing the mat between third and fourth platens, the third platen being contoured in a manner similar to the first side of the softboard, the fourth platen being contoured in a manner similar to the second side of the softboard.

In accordance with another aspect of the invention, a system for producing a consolidated cellulosic article is provided comprising a primary press, a removal tool, and a secondary press. The primary press includes first and second platens and a drive with the first and second platens having opposed, complementarily contoured, die surfaces. The drive is adapted to compress the first and second platens toward one another. The removal tool includes a blade for removal of cellulosic material in a planar fashion. The secondary press has first and second platens and a drive. The first and second platens have opposed die surfaces. The drive is adapted to compress the first and second platens toward one another.

These and other aspects and features of the invention will become more apparent upon reading the following detailed description when taken in conjunction with the accompanying drawings.

BRIEF DESCRIPTION OF THE DRAWINGS

FIG. 4 is a partial sectional view of an article being compressed by a secondary press according to the teachings of the invention;

FIG. 5 is a partial sectional view of an article being machined with an alterative removal plane according to the teachings of the invention;

FIG. 6 is a partial sectional view of an article being machined using an alternative tool according to the teachings of the invention.

Figure 1:
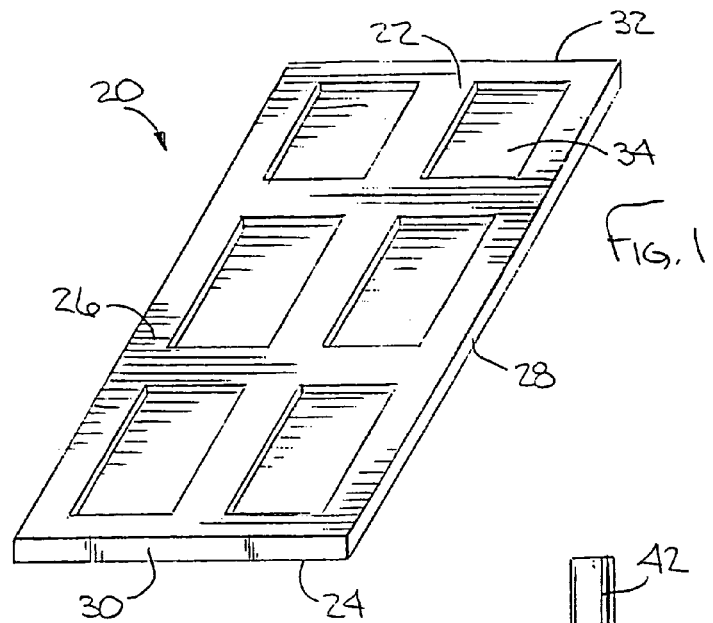
FIG. 1 is an isometric view of an article constructed in accordance with the teachings of the invention.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Referring now to the drawings, and with specific reference to FIG. 1, an article constructed in accordance with the teachings of the invention is generally referred to by reference numeral 20. While the article 20 is depicted as a six panel door facing, it is to be understood that the teachings of the invention can be employed in the construction of any number of other consolidated cellulosic articles having a contoured surface. Such articles include, but are not limited to, exterior house siding, flooring, furniture components, paneling, and cabinet doors.

As shown in FIG. 1, the article 20 includes a first or top surface 22, a second or bottom surface 24, first and second side edges 26, 28, and first and second end edges 30, 32. The top surface 22 is contoured, whereas the bottom surface 24 is flat or planar in the depicted embodiment. More specifically, the top surface 22 includes a plurality of indentations 34 of various dimension and depth to provide an appearance desirable for the end application of the article 20. In the depicted embodiment, the bottom surface 24 is flat to facilitate attachment of the article 20 to a door core, but it is to be understood that the article 20 may include a back surface having a non-flat contour as well.

Figure 2:
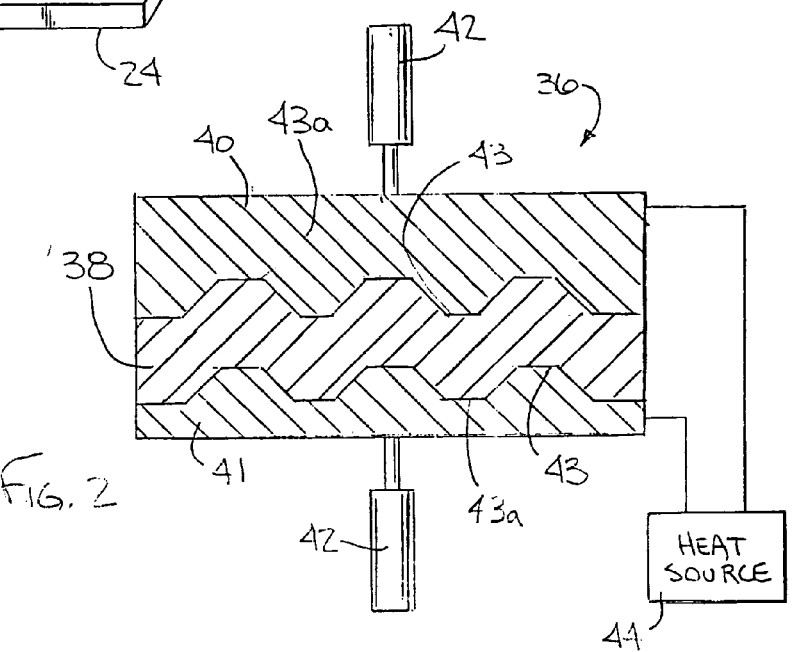
FIG. 2 is a partial sectional view of an article being compressed by a primary press according to the teachings of the invention.

Referring now to FIG. 2, a primary press 36 according to the teachings of the invention is depicted compressing a mat 38. The mat 38 is contemplated to be comprised of cellulosic material, such as wood fiber, mixed with a binding agent or resin. The binding agent may be a thermoset resin such as a phenolic resin or isocyanate. The mat 38 may be formed by sprinkling such fiber and binding agent or a moving conveyor belt. Variations in the height of the mat 38 may be removed with a scalping roller or the like. The belt is often of a mesh or otherwise perforated material to enable a vacuum device to hold the fiber on the belt. The primary press includes an upper platen or die 40, a lower platen or die 41, and a drive mechanism 42. The upper and lower platens are similarly contoured with complementary protrusions 43 and indentations 43a. The drive mechanism 42 is depicted as a hydraulic cylinder, but may be alternatively provided as with pneumatic actuators, chain and sprocket drives, pulley and belt drives, direct drive couplings to motors or other primary movers, etc. Each die 40, 41 is preferably heated, as by a heat source 44. The heat source 44 may be provided in the form of heat exchanger coils or channels through the dies 40, 41, through which heated fluid, e.g. water, is circulated, or in the form of separate hot platens.

Figure 3:
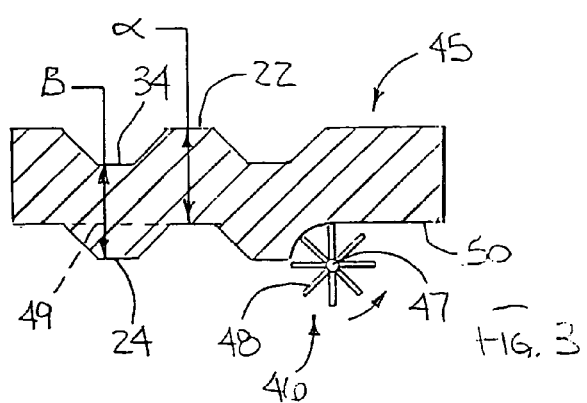
FIG. 3 is a partial sectional view of an article being machined after the primary press according to the teachings of the invention.

The primary press 36 compresses the mat 38 to a first level of density and caliper to result in a softboard 45 as shown in FIG. 3. A softboard is defined herein as a compressed mat of cellulosic fiber and a binding agent having a relatively low density, e.g., 10 to 30 lbs. per cubic foot. Such a softboard has sufficient strength to maintain its shape as opposed to being a loose pile of fiber, but would not be suitable for a solid product such as siding or doors. However, since the mat 38 is compressed between upper and lower dies 40, 41, having complementary configurations, the softboard 45 is compressed to a substantially uniform caliper and substantially uniform density. More specifically as noted in FIG. 3, zone $\alpha$ is of the substantially same height as zone $\beta$. Since the mat 38 begins with a uniform density and basis weight, after compression with such complementarily shaped dies 40, 41, the softboard 45 continues to have a uniform, although greater, density, and a uniform basis weight.

Once the softboard 45 is formed, it is machined in a planar fashion to reduce one or both of the top surface 22 or bottom surface 24. In the embodiment depicted in FIG. 3, the bottom surface 24 is machined by a rotary scalper 46. The rotary scalper 46 includes an axle 47 from which a plurality of blades 48 radially extend. The axle 47 is connected to a suitable drive mechanism (not shown) such as a chain and sprocket drive, a pulley and belt arrangement, or a direct coupling to a primary mover, so as to rotate the axle 47 and blades 48 relative to the softboard 45. In so doing, the contour of the bottom surface 24 is removed in the depicted embodiment of FIG. 3, resulting in a flat or planar surface 50.

In alternative embodiments, the bottom surface need not be completely flattened. The removal tool, be it the rotary scalper 46, a circular (dado) saw blade (FIG. 5), a band saw blade (FIG. 6), a sander (not shown), or the like, may be controlled to remove all cellulosic material in the softboard 45 up to a predetermined removal plane 49. For example, FIG. 5 depicts an alternatively machined softboard 45 wherein the removal plane traverses across the indentations 34, thereby allowing a portion of the indentation 34 to remain in the bottom surface 24. One of ordinary skill in the art will readily appreciate that the removal plane 49 can be located at any position within the softboard 45 and affect the ultimate shape of the top surface 22 or bottom surface 24, accordingly.

Referring now to FIG. 4, a secondary press 52 according to the teachings of the invention is depicted. The secondary press 52 preferably includes an upper platen or die 54 having a contour matching the contour of the top surface 22, and a lower platen or die 56 having a surface 58 matching the contour of the bottom surface 24. In the depicted embodiment, the bottom surface 24 is flattened, and thus the surface 58 is flat, but it is to be understood that if the bottom surface 24 otherwise shaped, e. g., machined to have a shape such as that of FIG. 4, the lower die 56 would be similarly shaped.

The upper and/or lower dies 54, 56 are coupled to a drive mechanism, such as a hydraulic cylinder 60, to compress the softboard 45 therebetween. The upper die 54 includes protrusions 62 positioned and dimensioned to align with indentations 34 provided within the softboard 45 and further compress the softboard 45 to a lower caliper and higher density. Since portions of the softboard 45 have been removed below the removal plane 49, the resulting article 20 has a variable basis weight across its length. Steam may be injected into the softboard 45 from an injector 63 during the secondary compression.

As indicated above, FIG. 6 depicts an alternative embodiment according to the teachings of the invention. In FIG. 6, rather than employing a rotary scalper 45 to remove cellulosic material from the softboard 45, a band saw 68 is employed. It is to be understood, that any number of other removal tools may be employed, including but not limited to, circular or dado saw blades and sanders.

Figure 7:
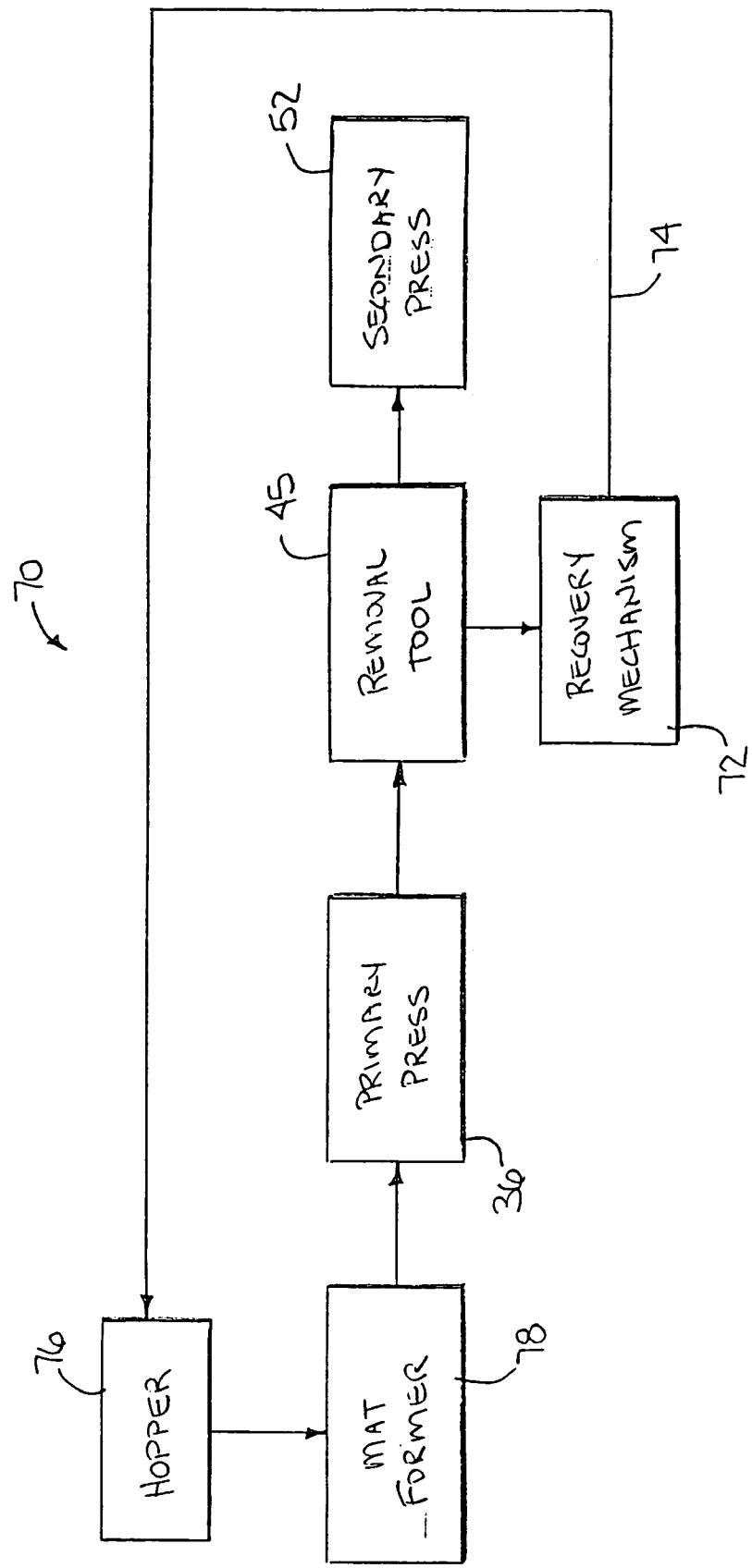
FIG. 7 is a schematic representation of a system constructed in accordance with the teachings of the invention.

Not only can the teachings of the invention be used to construct the article 20 having a contoured upper surface 22 and bottom surface 24, with the article 20 having a uniform density and variable basis weight, but since the article 20 is compressed in dual stages, the cellulosic material removed can be gathered and reused in the creation of subsequent articles 20. Accordingly, FIG. 7 depicts a system 70, which may be constructed in accordance with the teachings of the invention, including the primary press 36, the removal tool 45, and the secondary press 52, as well as recovery mechanism 72, recycling mechanism 74, a hopper 76, and a mat former 78. The gathering mechanism 72 may be provided in a number of forms, including, but not limited to, a basin or conveyor provided directly below the removal tool 45. A vacuum may also be employed. Employing a conveyor, gravity may be used to allow the removal of cellulosic material to fall into the conveyor and be transported back to a reservoir or hopper of cellulosic material (not shown). Alternatively, the vacuum may be provided proximate the removal tool 45 for gathering the cellulosic material immediately upon removal from the article 20.

From the foregoing, one of ordinary skill in the art will appreciate that the teachings of the invention can be employed to construct a consolidated cellulosic article having first and second surfaces contoured as desired, with a substantially uniform density and variable basis weight and caliper. Moreover, the article can be constructed in a manner enabling cellulosic material removed from the article in the process to be recycled and used in the creation of subsequent articles.

What is claimed is:

1. A system for producing a consolidated cellulosic article, comprising:
    a mat former;
    a primary press having first and second platens and a drive, the first and second platens having opposed, complementarily contoured, die surfaces, the drive being adapted to compress the first and second platens toward one another, said primary press for compressing a mat received from said mat former to form a softboard having first and second opposed major surfaces;
    a removal tool, the tool including a blade for removal of cellulosic material in a planar fashion, said removal tool for removing cellulosic material from at least the first major surface of the softboard received from said primary press; and
    a secondary press having first and second platens and a drive, said first platen having a die surface having a configuration corresponding to the first major surface of the softboard after removal of the cellulosic material by said removal tool, and said second platen having a die surface having a configuration corresponding to the second major surface of the softboard, the drive being adapted to compress the first and second platens toward one another, said secondary press for compressing the softboard received from said removal tool to form a consolidated cellulosic article.

2. The system of claim 1, wherein the removal tool is a rotary scalper.

3. The system of claim 1, wherein the removal tool is a band saw.

4. The system of claim 1, wherein the at least one of the primary and secondary presses includes a steam injector adapted to inject steam between the first and second platens.

5. The system of claim 1, wherein at least one of the primary and secondary presses include heating apparatus.

6. The system of claim 1, further including collection apparatus for collecting cellulosic material removed by the removal tool.

7. The system of claim 1, wherein said die surface of said second platen of the secondary press is flat.

8. The system of claim 6, further comprising a hopper operably associated with said mat former, said hopper feeding cellulosic material to said mater former.

9. The system of claim 8, wherein said collection apparatus includes a conveyor, said conveyor transporting the collected cellulosic material to said hopper.

10. The system of claim 6, wherein said collection apparatus includes a vacuum for gathering the removed cellulosic material.

* * * * *